United States Patent [19]

Bulle et al.

[11] Patent Number: 4,511,121
[45] Date of Patent: Apr. 16, 1985

[54] TIRE SPREADER

[76] Inventors: Marshall R. Bulle, 917 2nd St., Farmington, Minn. 55024; Dale A. Johnson, 6336-19th Ave. S., Richfield, Minn. 55423

[21] Appl. No.: 614,314

[22] Filed: May 25, 1984

[51] Int. Cl.³ ............................................. B60C 25/14
[52] U.S. Cl. .................................................. 254/50.4
[58] Field of Search .............................. 254/50.1–50.4; 157/1, 16; 269/239, 228

[56] References Cited

U.S. PATENT DOCUMENTS

| 1,713,488 | 5/1929 | Grundmark | 254/50.2 |
| 1,753,035 | 4/1930 | Weaver | |
| 1,849,034 | 3/1932 | Dettling | |
| 1,878,515 | 9/1932 | Hazard | |
| 1,907,007 | 5/1933 | Robertson | 254/50.4 |
| 2,032,295 | 2/1936 | Mehnert | 254/50.4 |

Primary Examiner—Robert C. Watson
Attorney, Agent, or Firm—Donald A. Jacobson

[57] ABSTRACT

Two hooks are pivotably mounted between two pair of vertically oriented pivotable spreader arms arranged such that the hooks can engage and spread a tire supported on two rollers between the hooks. The rollers are mounted on a plate supported by two vertical spaced channels held by a base. The arms are all pivotably connected by linkages to a carriage which moves on bearings through the vertical channels. Two of the opposing linkages, one from each side of the carriage, extend beyond the spreader arms and are bent first inward towards each other and then parallel to each other to accept a handle. The opposing pairs of spreader arms are urged toward each other by springs. The linkages are arranged such that moving the handle upward will cause the hooks to approach each other while moving the handle downward will cause the hooks to move apart to spread a tire mounted upon the rollers a predetermined distance.

5 Claims, 4 Drawing Figures

TIRE SPREADER

BACKGROUND OF THE INVENTION

A number of devices have been invented which address the problem of spreading a rubber tire casing to facilitate inspection and repair. These devices have been designed to spread a conventional tire of the type in which a cord reinforcement is imbedded around its circumference. A tire having a circumferential cord can be partially reversed by gripping a portion of the bead and pulling downward until a part of the inner surface of the tire is exposed to make the inspection and repair easier. For example, Dettling U.S. Pat. No. 1,849,034 utilizes a jack mechanism with a convex upper portion which forces the tire upward by bearing against the tread while two hooks hold the beaded edges of the tire stationary in order to reverse the tire shape and expose the inner surface. In Weiver U.S. Pat. No. 1,753,035 the device operates in a similar manner excepting that the tire is held by a plate having rounded corners and utilizes two opposing hooks driven by a piston and cylinder operated by air pressure which pull the tire beads downward to reverse the tire over the plate.

In Hazard U.S. Pat. No. 1,878,515 a pair of hook arms are driven by a piston and cylinder operated by air or pressurized fluid which engage the beads of a tire and pull them laterally apart while the base is supported by an arc shaped plate. This urges the tire into an inside-out attitude to expose the inner surface. These devices work well enough with conventional tires having reinforcing cords running circumferentially in that no injury to the tire results. In contrast, tires which have reinforcing cords which run radially in their orientation cannot be reversed in the above manner without the potential of causing a structural failure of the tire.

The present invention provides the spreading function in a device which is greatly simplified from the previous devices and which does not reverse the tire casing but merely spreads it a predetermined amount below the separation point of the cords to avoid injury to the radial tire casing. In addition, the spreading mechanism is arranged such that the maximum mechanical advantage is obtained at the point of maximum tire spread where the maximum force is required. This permits the mechanism to be operated manually with a minimum of effort.

SUMMARY OF THE PRESENT INVENTION

A horizontal supporting stand is mounted upon a pair of parallel spaced vertical U-channels mounted web side inward which in turn support a horizontal plate. Two U-shaped brackets are mounted parallel to each other on opposite upper ends of the plate perpendicular to the channel webs. Each bracket supports a roller of approximate tire width with a spring approximately twice its width.

A carriage consisting of two opposed rectangular plates are held together by shoulder bolts which hold the plates together through the space between the two vertical channels. Holes in the plates adjacent to the bolt head are sized such that the plate can move over the bolt shoulder. The length of the bolt shoulder establishes a distance between the two opposing plates to ensure that a pair of sleeve bearings the length of the bolt shoulder mounted over the bolt shoulder can rotate freely.

A pair of two generally vertical spreader arms are located in the plane of each carriage plate with the lower end of each pair of arms pivotably connected together by a lower spacer link such that each plate is bracketed by the pair of arms on its respective side. A hook is pivotably mounted between each opposing pair of arms on opposite sides of the carriage such that the hook can engage the bead of a tire placed upright between the rollers. Two linkeages are pivotably attached to each side of the carriage between a bolt through the center of the carriage and a rivet through the lower portion of each adjacent spreader arm. The distances between the bolt and each spreader arm are the same as is the distance from the rivets to the ends of the spreader arms however, one pair of links which oppose each other on opposite sides of the carriage have extensions opposite the spreader arm side which are bent inward parallel to each other near their ends to form a lever arm and have a handle mounted over these ends to form a lever arm and have a handle mounted over these ends.

A pair of springs are attached near the top of each opposing pair of spreader arms to urge the opposing arms toward each other.

The length of the various linkages and the location of the pivot points are such that when the lever arm is horizontal the links from the third carriage bolt to the opposite spreader arm will also be horizontal and the arms spread the maximum amount. A stop is provided for the carriage slightly below this location to prevent the carriage from moving downward while the horizontal plate acts as a stop for the upper motion of the carriage. Alternate locations for the hook pivot points in the spreader arms and on the hook proper provide adjusting means.

Moving the lever arm up or down moves the spreader arms in or out relative to each other and in the lower position causes the hooks to spread the adjacent tire bead. When the lower arm is moved downward slightly past the maximum spread location against the stop it is held in this location by the tire itself requiring that the lever arm be lifted to free the tire.

DETAILED DESCRIPTION OF THE INVENTION

Figure 1:
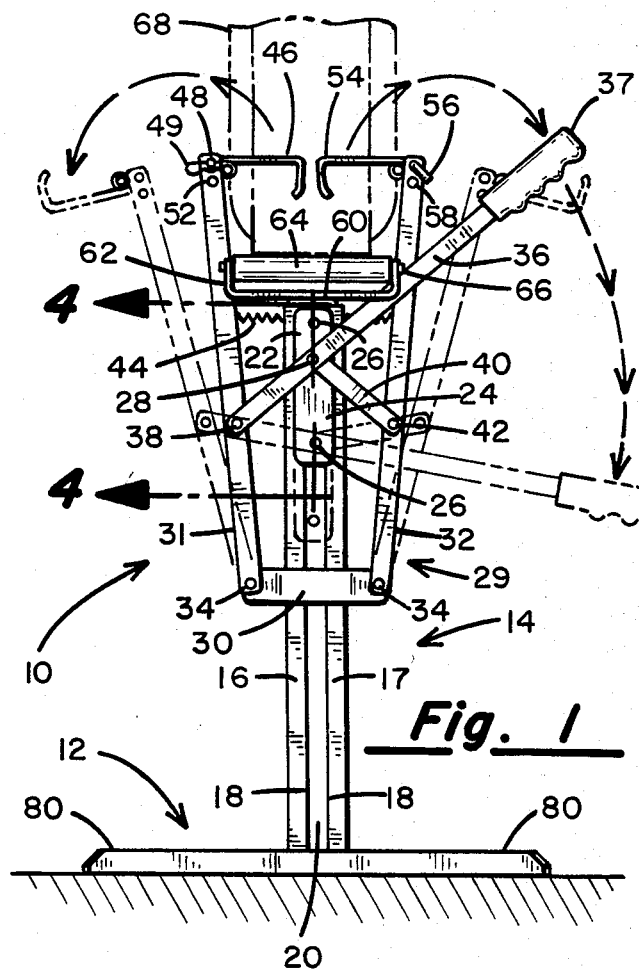
FIG. 1 is a front view of the device with a mounted tire shown in phantom outline.

A tire spreader 10, in FIG. 1, is shown in full outline open and in dashed outline closed. A base 12 holds a vertical support 14 which consists of two identical U-shaped channels, a left channel 16 and a right channel 17 mounted with channel webs 18 facing each other defining a parallel opening 20 between the channels for their full length.

A carriage 22 made up of two identical rectangular plates, a front plate 24 and a rear plate 25, not shown in this figure, are mounted on opposite sides of supports 14 and held together by two shoulder bolts 26 through opposing aligned holes in plates 24 and 25 inserted through opening 20. The detailed construction of the carriage will be described later. Identical actuating mechanisms 29 are attached outboard of plate 24 and 25 by a bolt 28 through both mechanisms and the plates with the bolt mounted through opening 20. The rear mechanism 29 is identical in operation and in components to front mechanism 29 excepting that the rear mechanism is a mirror image of the front mechanism therefore only the front mechanism will be described with the exception of the connection of the two mechanisms. Identification numbers for individual items of front mechanism 29 will also be assigned to the equivalent matching part of rear mechanism 29. Front mechanism 29 consists of a spacer link 30 pivotably attached to a left spreader arm 31 and a right spreader arm 32 by means of rivets 34 through suitably sized holes in the ends of the spacer link and each respective arm. Spreader arm 31 is pivotably connected to one end of a lever arm 36 by a rivet 38 through suitably sized holes in the central portion of the spreader arm and the end of the lever arm. Front and rear lever arms 36 are bent inwardly at a point well beyond spreader arm 31 and then outwardly such that the ends of the arms are parallel and are covered with a handle 37. The dimensions of the various parts and their attachment points will be described later. Lever arm 36 is pivotably connected to plate 24 by a bolt 28 through suitably sized aligned holes in the central portion of the lever arm and in the plate. A connecting link 40 is pivotably connected to right arm 32 by means of a rivet 42 through suitably sized aligned holes through one end of the link and the middle portion of the right spreader arm. Link 40 is pivotably connected to plate 24 by bolt 28 mounted through a suitably sized hole in the end of the link.

A spring 44 is attached between left spreader arm 31 and right spreader arm 32 of a proper length and spring tension to urge the two arms together. A hook 46 is pivotably attached to the upper end of front left spreader arm 31 of front mechanism 29 and to rear left arm spreader 31 of rear mechanism 29 by means of an L-shaped pin 48 through suitably sided aligned holes in the ends of the arms and in the end of the hook and secured by a spring loaded retainer 49. A second hole 50 is provided adjacent to first in the end of hook 46 to provide an adjustment for the effective hook length which will be described further later. A second pair of holes 52 are also provided in both front and rear spreader arms 31 adjacent to the first to provide an adjustment for the attachment point of hook 46 to arms 31. A second hook 54 is pivotably attached to the ends of front right spreader arm 32 and rear right spreader arm 32 by means of an L-shaped pin 56 through suitably sized aligned holes in the ends of the arms and the hook and secured by a spring loaded retainer 57. A second hole in hook 54, not shown, located in the same relative position as hole 50 in hook 46 also provides adjustment for hook length. A second pair of holes 58 in both front and rear arms 32 provides an adjustment for the attachment point of hook 54.

A rectangular shaped horizontal shelf 60 is attached to the top of channels 16 and 17 with the narrow dimension facing opening 20 between the channels. Two U-shaped brackets 62 are attached on the upper side on each narrow end of shelf 60 perpendicular to the long dimension. A roller 64 is pivotably secured within each bracket 62 by rivets 66 mounted through a proper sized hole in the center of each of the rollers and matching aligned holes in the two brackets.

Figure 2:
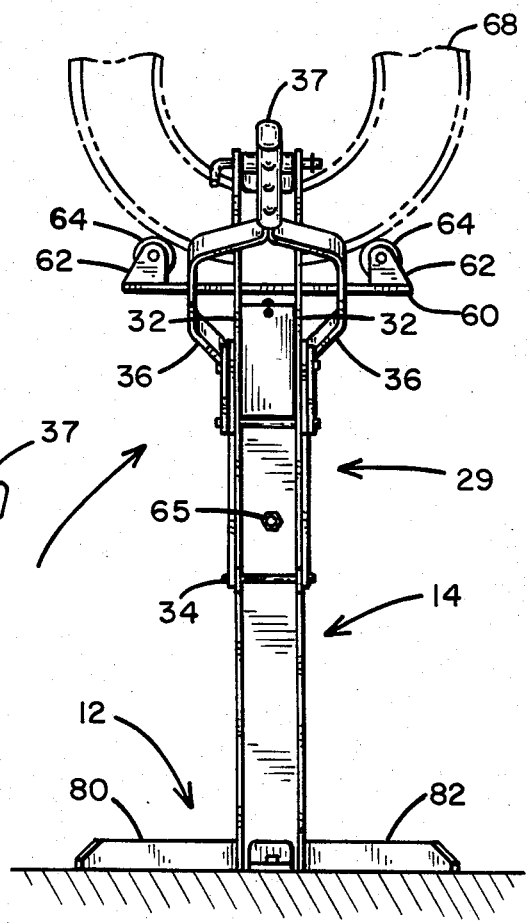
FIG. 2 is a side view of the device.

In FIG. 2 lever arms 36 are shown each having an outward bend from a point near bolt 28 to a point well clear of front and rear arms 32 then together and parallel near the end to provide an attachment point for a handle 37. A tire 68 shown in phantom outline, is supported upon the rollers 64. A stop 65 for carriage 22 is provided by a bolt secured with a nut and mounted through suitable sized aligned holes in channels 16 and 17.

Figure 4:
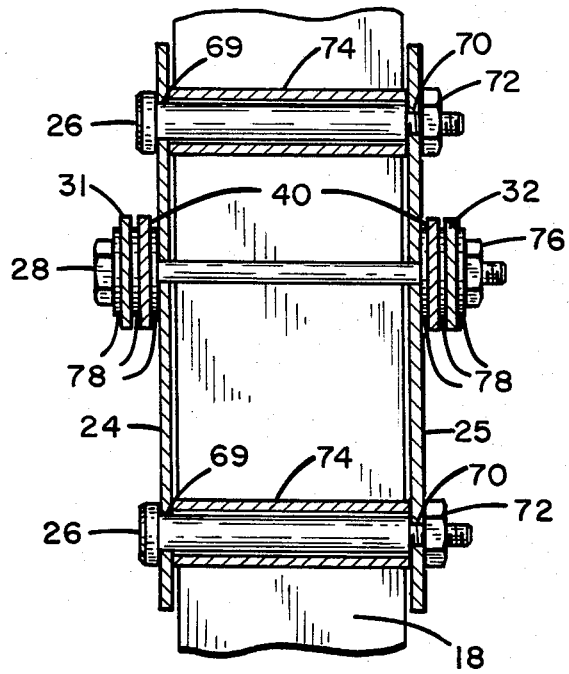
FIG. 4 is a detail of the device taken along lines 4—4 in FIG. 1.

Referring to FIG. 4 the detailed construction of carriage 22 can be seen. Shoulder bolts 26 extend through holes 69 in plate 24 which are of a size to accomodate the larger diameter of the shoulder of the bolt and thence through holes 70 in plate 25 which are of a size to accomodate only the smaller diameter of the bolt. Nuts 72 secure shoulder bolts 70 in place. Bearings 74, consisting only of a length of steel piping having an inner diameter slightly larger than the maximum diameter of bolt shoulder 26, are provided about the shoulder bolts. The length of bearings 74 are less than the length of the shoulder portion of shoulder bolts 26, less the thickness of front plate 24 and rear plate 25. This length insures that when nuts 72 are fully tightened forcing plates 24 and 25 against the opposite ends of the shoulders of bolts 26 that bearing 74 can push front plate 24 outward a sufficient distance to permit the bearings to turn freely about the bolts. Bolt 28 through the center of carriage 22 is mounted through left arm 31, front link 40, and rear right arm 32 and is secured by nut 76 having washers 78 interspersed between the various parts to reduce the friction.

Figure 3:
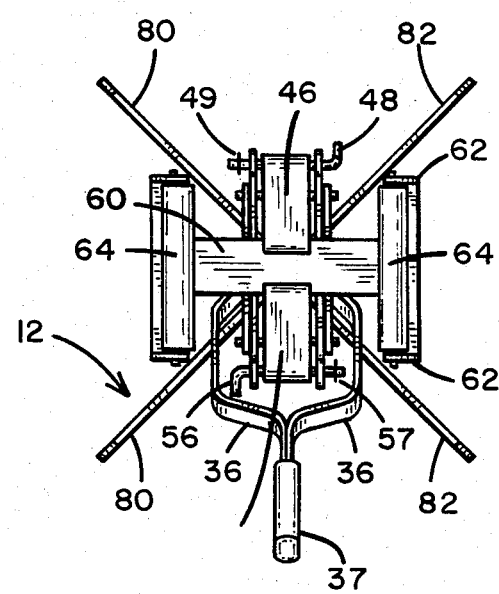
FIG. 3 is a top view of the device.

In FIG. 3 the location of hooks 46 and 54 versus rollers 64 can be seen and the relationship of bent bars 80 and 82 making up the four legs of the base.

To operate this device handle 37 is lifted by hand to the upper position shown in solid outline in FIG. 1. In this position, carriage 22 is elevated and the linkage attached to the carriage moves spreader arms 31 and spreader arms 31 and 32 are moved to their closest position relative to the central axis of the machine and after the handle is released the spreader arms are held in this position by spring 44. Hooks 46 and 54 are then rotated to their outboard position as shown in phantom outline. Tire 68 is then placed upon rollers 64 in the orientation shown and hooks 46 and 54 are then rotated to their inboard position, as shown in solid outline placing them in a position to engage the bead of the tire.

Handle 37 is then moved to the lower position, shown in phantom outline, in FIG. 1. The downward movement of handle 37 moves carriage 22 downward and rotates the lever arm 36 clockwise to a position slightly below horizontal, link 40 is rotated counterclockwise also slightly below horizontal. Carriage 22 is halted in this position by stop 65 acting against lower shoulder bolt 26.

This action of lever arm 36 and lever arm 40 moves front left spreader arm 31 and front right spreader arm 32 outward to a greater separation and likewise moves the rear spreader arms to the same position. The spreader arms carry hooks 46 and 54 outward which spreads tire 68. The motion of hooks 46 and 54 is essentially in a horizontal line during this process which spreads tire 68 but does not reverse its cross-section. Since tire 68 is made of rubber or material with similar characteristics it tends to return to its original shape thereby placing an inward directed force on arms 31 and 32 through hooks 46 and 54, but since the lever arm 36 and link 40 are rotated downward past a horizontal position this force merely urges carriage 22 downward against stop 65. During this process the relative position of bolt 28 sweeps out arcs with respect to rivets 38 and 42. This relative motion is essentially circular with a zero horizontal excursion when lever arm 36 is horizontal and as this location is approached the horizontal motion of the rivets for a given angular portion of lever arm 36 approaches zero. This results in an effective increase in the lever ratio the closer that lever arm 36 approaches horizontal. This has the desired result of maximizing the mechanical advantage for a given effort at the maximum excursion of tire 68 where the maximum force is required to spread the tire. This automatic increase in mechanical advantage at the very place a maximum force is required results in a spreader which is easy to operate manually.

After spread tire 68 is inspected and repaired lever arm 36 is then lifted to the upward position shown in FIG. 1 which again moves hooks 46 and 54 to their closest approach to free the tire. A second location on the interior of tire 68 can be inspected by rotating the tire about its center axis against rollers 64, then again spreading the tire, as described earlier by moving handle 37 to its lowest position. Tire 68 is released from the second location by again lifting handle 37 to its upward position. After all desired locations have been inspected and repaired in this manner, handle 37 is raised to the upper position, hooks 46 and 54 are rotated outboard clear of tire 68 and tire 68 lifted off spreader 10.

This device is simple and straightforward in its design and operation. The automatic increase in mechanical advantage where maximum spreading force is required makes manual operation relatively effortless even though the spreading force required is considerable. All parts, fasteners, and rollers are made from strap steel and merely require cutting, piercing, and bending for use. The simplicity of the design yields a long operational life with low cost repair. No castings are required for any portion of the device in contrast with existing devices.

What is claimed is:

1. A device for spreading the side walls of a cord-reinforced vehicle tire casing to facilitate the inspection and repair of the interior of said casing, comprising:
   (a) a stand having a vertically extending post member;
   (b) carriage means slideably mounted on said post member for a reciprocal motion therealong;
   (c) a pair of elongated arms pivotably coupled at one end thereof to a common spacer member and having rotatable hook members operatively coupled to the other end of said elongated arms;
   (d) an operating lever pivotably coupled at one end to one of said pair of elongated arms at a point on said one of said pair of elongated arms intermediate said one and other ends thereof; said operating lever being movable between a raised and a lowered position;
   (e) linkage means pivotably joined to the other of said pair of elongated arms at a point intermediate said one and other ends thereof and pivotably joined to said operating lever and to said carriage means;
   (f) means for supporting a tire casing in a generally vertical plane such that said hook members can be made to engage the bead of said tire when said operating lever is in said raised position and said hook members apply a separating force when said operating lever is moved to its lowered position.

2. The device as in claim 1 wherein said stand comprises:
   (a) a base; and
   (b) a pair of U-shaped channels of a predetermined length affixed to said base and extending vertically therefrom, said channels extending parallel to one another and with the web portion of said U-shaped channels facing each other with a predetermined uniform spacing therebetween.

3. The device as in claim 2 wherein said means for supporting said tire casing comprises:
   (a) a generally flat plate member secured to the upper ends of said pair of U-shaped channels and extending parallel to said base; and
   (b) first and second elongated roller means rotatably mounted on said flat plate at a height and of a spacing relative to one another that a tire casing placed upon the roller means will be totally supported by said roller means above said flat plate.

4. The device as in claim 2 wherein said carriage means comprises a pair of plate members whose width is greater than said predetermined spacing and individually disposed on opposite sides of said channels and held together by spacer means extending through the space between said webs.

5. The device as in claim 4 wherein said spacer means are mounted within bearing means.

* * * * *